(12) United States Patent
Wu et al.

(10) Patent No.: US 8,553,493 B2
(45) Date of Patent: Oct. 8, 2013

(54) METHOD FOR PERMEABLE ZONE DETECTION

(75) Inventors: Peter T. Wu, Missouri City, TX (US);
Alain Dumont, Kawasaki (JP); Pierre Campanac, Sugar land, TX (US); David Linton Johnson, Somerville, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1113 days.

(21) Appl. No.: 11/964,736

(22) Filed: Dec. 27, 2007

(65) Prior Publication Data

US 2009/0168598 A1 Jul. 2, 2009

(51) Int. Cl.
*G01V 1/40* (2006.01)
(52) U.S. Cl.
USPC ............................................. 367/35; 367/25
(58) Field of Classification Search
USPC ................. 73/152, 152.05, 152.16; 181/105, 181/106, 122; 340/854.4; 367/25, 31, 75; 702/6
See application file for complete search history.

(56) References Cited

U.S. PATENT DOCUMENTS

| | | | |
|---|---|---|---|
| 4,354,381 A | 10/1982 | Medlin et al. | |
| 4,594,691 A | 6/1986 | Kimball | |
| 4,964,101 A * | 10/1990 | Liu et al. | 367/31 |
| 5,278,805 A | 1/1994 | Kimball | |
| 5,687,138 A * | 11/1997 | Kimball et al. | 367/31 |
| 5,784,333 A | 7/1998 | Tang et al. | |
| 6,850,168 B2 * | 2/2005 | Tang et al. | 340/854.4 |
| 7,970,544 B2 | 6/2011 | Tang et al. | |

| | | | |
|---|---|---|---|
| 2003/0058739 A1 | 3/2003 | Hsu et al. | |
| 2006/0083108 A1 * | 4/2006 | Wu | 367/31 |
| 2006/0120217 A1 | 6/2006 | Wu et al. | |

FOREIGN PATENT DOCUMENTS

| | | |
|---|---|---|
| WO | WO 2006/121640 A1 | 11/2006 |
| WO | WO 2007/001746 A1 | 1/2007 |

OTHER PUBLICATIONS

Rosenbaum, "Synthetic Microseismograms: Logging in Porous Formations", Geophysics, vol. 39, No. 1, (Feb. 1974).
Kimball et al. "Semblance Processing of Borehole Acoustic Array Data," Geophysics, vol. 49, No. 3 (Mar. 1984).
R. S. Carmichael, "Handbook of Physical Properties of Rocks", CRC Press, 1982.
M.A. Biot, "Theory of Propagation of Elastic Waves in a Fluid-Saturated Porous Solid. I. Low-Frequency Range", 1956 J. Acoustic Society of America, V28, pp. 168-178.
M.A. Biot, Theory of Propagation of Elastic Waves in a Fluid-Saturated Porous Solid. II. Higher Frequency Range, 1956 J. Acoustic Society of America, V28, pp. 179-191.
Hauer, J.F. et al., "Initial Results in Prony Analysis of Power System Response Signals". IEEE Transactions on Power Systems 1990, vol. 5, No. 1, 80-89.

(Continued)

*Primary Examiner* — Isam Alsomiri
*Assistant Examiner* — Daniel L Murphy
(74) *Attorney, Agent, or Firm* — Jianguang Du; Brigitte Jeffery Echols

(57) ABSTRACT

A method for estimating formation permeability from measured sonic wave Stoneley attributes and particularly the Stoneley attributes of slowness (DTst) and attenuation (ATTst), taking into consideration the existence of a heavy walled drill collar at the end of the drill string and the relative lack of borehole mud cake during a drilling operation. In the subject LWD application a real-time qualitative indication for fracture and permeable zones is estimated from Stoneley measurements. This information is useful to a driller to make important timely decisions about drilling and completion programs.

13 Claims, 4 Drawing Sheets

(56) References Cited

OTHER PUBLICATIONS

Theodoros Klimentos, "Attenuation of P- and S-waves as a method of distinguishing gas and condensate from oil and water", Geophysics, vol. 60, No. 2 (Mar.-Apr. 1995); p. 447-458, 13 Figs.

A. Brie, F. Pampuri, A.F. Marsala, O. Meazza "Shear Sonic Interpretation in Gas-Bearing Sands", SPE 30595, Copyright 1995, Society of Petroleum Engineers, Inc., SPE Annual Technical Conference & Exhibition held in Dallas, U. S.A., Oct. 22-25, 1995.

Chuen Hon Cheng, M. Nafi Toksoz, and Mark E. Willis, "Determination of In Situ Attenuation From Full Waveform Acoustic Logs", Journal of Geophysical Research, vol. 87, No. B7, pp. 5477-5484, Jul. 10, 1982.

Jennifer Market, Craig Barnett, Ron Deady, Gary Althoff Sperry "New Processing Techniques to Meet Challenges of LWD Acoustic Logging", SPE 71731, Copyright 2001, Society of Petroleum Engineers Inc., 2001 SPE Annual Technical Conference and Exhibition held in New Orleans, Louisiana, Sep. 30-Oct. 3, 2001.

Brian E. Hornby and Eric S. Pasternack, "Analysis of Full-Wavefrom Sonic Data Acquired in Unconsolidated Gas Sands", Petrophysics, vol. 41., No. 5 (Sep.-Oct. 2000); p. 363-374; 13 Figures.

T. Klimentos, "Petrophysics and Seismic Wave Technology: Applications in Exploration, Formation Evaluation, and Reservoir Characterization" SPE 29887, Copyright 1995, Society of Petroleum Engineers, Inc, SPE Middle East Oil Show held in Bahrain, Mar. 11-14, 1995.

Z. Liu & J. W. Rector, K.T. Nihei, L. Tomutsa, L. R. Myer & S. Nakagawa , "Extensional wave attenuation and velocity in partially-saturated sand in the sonic frequency range", Rock Mechanics in the National Interest, Elsworth, Tinucci Heasley(eds), © 2001 Swets & Zeitlinger Lisse, ISBN 90 2651 827 7.

William Murphy, Andrew Reischer, and Kai Hsu, "Modulus decomposition of compressional and shear velocities in sand bodies", Geophysics, vol. 58, No. 2 (Feb. 1993), p. 227-239, 13 Figs.

Azra N. Tutuncu, Augusto L. Podio, and Mukul M. Sharma, "An experimental investigation of factors influencing compressional- and shear-wave velocities and attenuations in tight gas sandstones", Geophysics, vol. 59, No. 1 (Jan. 1994); p. 77-86, 15 Figs., 1 Table.

Kenneth W. Winkler, "Estimates of velocity dispersion between seismic and ultrasonic frequencies", Geophysics, vol. 51, No. 1(Jan. 1986); p. 183-189, 8 Figs., 1Table.

A. Brie, and T. Endo, D.L. Johnson, and F. Pampuri, "Quantitative Formation Permeability Evaluation from Stoneley Waves" SPE Reservoir Eval. & Eng. 3 (2), Apr. 2000, Copyright © 2000 Society of Petroleum Engineers. (This paper (SPE 60905) was revised for publication from paper SPE 49131, prepared for presentation at the 1998 SPE Annual Technical Conference and Exhibition, New Orleans, Sep. 27-30. Original manuscript received for review Dec. 1, 1998. Revised manuscript received Oct. 14, 1999. Paper peer approved Nov. 15, 1999.).

X. M. Tang, and D. Patterson, "Estimating Formation Permeability and Anistoropy From Borehole Stoneley Waves", SPWLA 45th Annual Logging Symposium, Noordwijk, The Netherlands Jun. 6-9, 2004, Copyright 2004, held jointly by the Society of Petrophysicists and Well Log Analysts (SPWLA) and the submitting authors.

Xiaoming Tang and C. H. Cheng, "Fast inversion of formation permeability from Stoneley wave logs using a simplified Biot-Rosenbaum model", Geophysics, vol. 61, No. 3 (May-Jun. 1996); p. 639-645, 7 Figs.

* cited by examiner

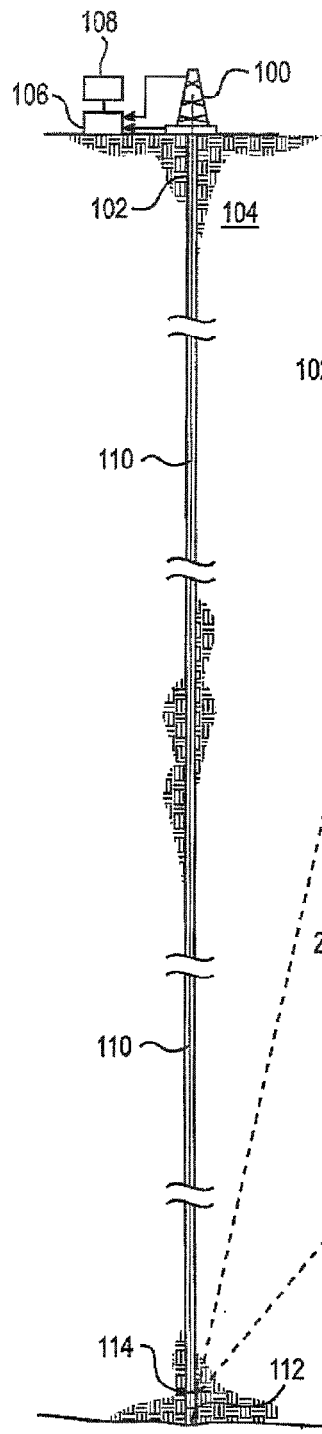
FIG. 1
PRIOR ART
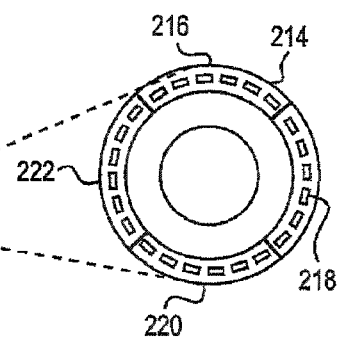
FIG. 2a
PRIOR ART
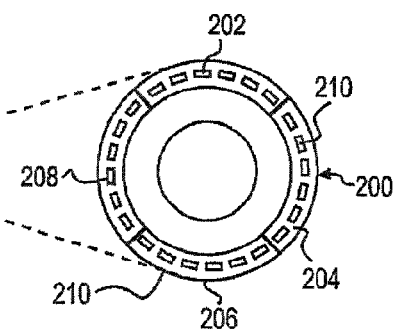
FIG. 2c
PRIOR ART
FIG. 2b
PRIOR ART

METHOD FOR PERMEABLE ZONE DETECTION

TECHNICAL FIELD

This invention relates to logging while drilling (LWD) measurement of sonic wave component attributes and use of that information to derive a real time qualitative indicator for fracture and permeable zones. More specifically, this invention is directed to determining Stoneley wave attributes, particularly slowness and attenuation, and using those attributes to obtain an estimate of formation permeability. The drill string, drill collar, which displaces most of the borehole fluid in the drilling area, has a significant effect on the Stoneley wave measurements while there will be little mud cake along the wall surfaces of a relatively fresh borehole; these effects are taken into account.

BACKGROUND OF THE INVENTION

In the oil and gas industry, acoustic tools are used to provide measurements of the attributes (such as slowness, time, coherence, coherent energy, attenuation and instantaneous frequency,) of various types of sonic waves propagated from transmitter to receiver. These attributes are analyzed to help estimate, among other things, the permeability and the mobility of the fluid content of the formation. These estimates are the basis for critical assessments concerning the rate of flow of a hydrocarbon (gas or oil) out of a producing borehole. Collecting, recording, and analyzing the seismic wave attributes to obtain information about the formation and the hydrocarbon contained within it on a delayed or real time basis is known as well logging.

Evaluation of physical properties such as pressure, temperature and wellbore trajectory in three-dimensional space and other borehole characteristics while extending a wellbore is known as measurements-while-drilling (MWD) and is standard practice in many drilling operations. MWD tools that measure formation parameters such as resistivity, porosity, sonic velocity, gamma ray, etc. of a formation are known as logging while drilling (LWD) tools. Information that can help the driller make important and timely decisions about the drilling program are indicators of fracture and permeable zones in a formation on a real time basis.

For the above and other reasons, the oil industry has developed acoustic well logging techniques that involve placing an acoustic tool within a well bore to make measurements indicative of formation attributes such as compressional slowness (DTc), shear slowness (DTs) and Stoneley slowness (DTst). Sonic logs can be used as direct indications of subsurface properties and, in combination with other logs and knowledge of subsurface properties, can be used to determine subsurface parameters, such as those related to borehole structural stability, that can not be measured directly. Early efforts in this connection were reported by Rosenbaum in "Synthetic Microseismograms: Logging in Porous Formations", Geophysics, Vol. 39, No. 1, (February 1974) the disclosure of which is incorporated by reference as though set forth at length.

Acoustic logging tools typically include a transmitter and an array of axially spaced acoustic detectors or receivers. These tools are operable to detect, as examples, formation compressional waves (P), formation shear waves (S) and Stoneley or tube waves (St). These measurements can be performed following drilling or during intermediate drill string trips by wireline logging operations. In wireline logging, sonic monopole tools can be used to excite and detect compression waves (P) and Stoneley waves (St) in all formations and shear waves (S) in fast formations. In addition to wireline logging, techniques have been developed where piezoelectric transmitters and hydrophone receivers are imbedded within the walls of drill string segments so that sonic LWD operations can be performed.

Early LWD and sonic data processing techniques developed by the Schlumberger Technology Corporation such as a slowness-time-coherence (STC) method is disclosed in U.S. Pat. No. 4,594,691 to Kimball et al. entitled "Sonic Well Logging" as well as in Kimball et al. "Semblance Processing of Borehole Acoustic Array Data," Geophysics, Vol. 49, No. 3 (March 1984). This method is most useful for non-dispersive waveforms (e.g. monopole compressional and shear head waves). For processing dispersive waveforms a dispersive slowness-time-coherence (DSTC) method is preferred. This process is disclosed in U.S. Pat. No. 5,278,805 to Kimball entitled "Sonic Well Logging Methods and Apparatus Utilizing Dispersive Wave Processing." The disclosures of these patents, of common assignment with the subject application, as well as the noted Geophysics publication authored by an employee of Schlumberger are hereby also incorporated by reference.

Sonic wireline tools, such as a Dipole Shear Sonic Imager (DSI—trademark of Schlumberger) and Schlumberger's Sonic Scanner generally have a multi-pole source. A multi-pole source may include monopole, dipole and quadrupole modes of excitation. The monopole mode of excitation is used traditionally to generate compressional and shear head waves such that formation compressional and shear slowness logs can be obtained by processing the head wave components. The head wave components are non-dispersive and are generally processed by slowness-time-coherence (STC) methods as discussed in the Schlumberger Kimball et al. '691 patent and Vol. 49 Geophysics article noted above.

The slowness-time-coherence (STC) method is employed to process the LWD sonic waveform signals for coherent arrivals, including the formation compressional, shear and borehole Stoneley waves. This method systematically computes the coherence(C) of the signals in time windows which start at a given time (T) and have a given window move-out slowness (S) across the array. The 2D plane with slowness on the y-axis and time on the x-axis is called the slowness-time-plane (STP). All the coherent arrivals in the waveform will show up in the STP as prominent coherent peaks. The compressional, shear and Stoneley slowness (DTc, DTs, and DTst) will be derived from the attributes of these coherent peaks.

The response of the Stoneley wave to open micro-fractures and permeable pore zones is essentially the same. In the past, Schlumberger U.S. Pat. No. 4,964,101 has described how to use wireline-measured Stoneley wave slowness and attenuation to detect these zones and compute the fluid mobility over these zones. The disclosure of this Schlumberger '101 patent is incorporated by reference as though set forth at length. In this prior '101 patent disclosure, the logging tool is considered acoustically transparent, i.e. a model of fluid-filled borehole through a permeable formation is employed. In logging while drilling operations using sonic transmitters and sensors carried by a drill string, the presence of the rigid drill collar changes the behavior of the Stoneley wave significantly. For example, the attributes of the wave will generally be more sensitive to fluid mobility than in the case of a fluid-filled borehole without the drill collar.

In the prior Schlumberger U.S. Pat. No. 4,964,101 patent a key component was the specific way to address mud cake effects on the Stoneley dispersion curve. In an LWD environment, due to the drill collar agitation and a short time lag between a borehole drilling operation and LWD measurements, it is generally expected that mud cake on the borehole wall will not have been formed and thus will not be a significant factor when LWD measurements are taken. Instead with a LWD drill string operation the effect of a relatively large diameter and heavy drill collar in the borehole is a significant factor for consideration and accommodation.

Although measuring Stoneley wave slowness and attenuation to detect micro-fractures and permeable pore zones in the past has been used with wireline tools, it would be desirable to make LWD measurements using a drill string that includes a thick-walled, drill collar.

SUMMARY OF THE INVENTION

The subject invention takes into account the effects of the massive drill collar and the relative absence of mud cake, to model waveforms generated by the LWD sonic tool over a range of values of formation permeability. The computation formula requires a number of input parameters that are either known or estimated from logging data, well site samples, and standard handbooks. The model waveforms are processed, for example with the slowness time coherence (STC) algorithm, to derive theoretical relationships between Stoneley wave slowness and formation permeability and between Stoneley wave attenuation and formation permeability. The measured waveforms, obtained during LWD operations, are processed in a similar manner to derive estimates of Stoneley wave slowness and attenuation.

These estimates are used in conjunction with the theoretical relationships to obtain two values of formation permeability that can be used individually or together to determine a final value of formation permeability.

THE DRAWINGS

Other aspects of the present invention will become apparent from the following detailed description of embodiments taken in conjunction with the accompanying drawings wherein:

FIG. 1 is a schematic of a typical derrick and a logging while drilling (LWD) system where a drill string is positioned within a borehole and a well logging segment near a drill bit is shown within a borehole;

FIG. 2a is an enlarged diagram of a logging tool within a borehole taken at a location above a drill bit and disclosing a thick walled drill collar carrying seismic transmitters and receivers;

FIG. 2b is a schematic cross-sectional view of a quadrupole sonic transmitter taken from the LWD segment shown in FIG. 2a;

FIG. 2c is a schematic cross-sectional view of a quadrupole receiver from a stack of receivers of the LWD drill collar tool shown in FIG. 2a;

DETAILED DESCRIPTION

Figure 3:
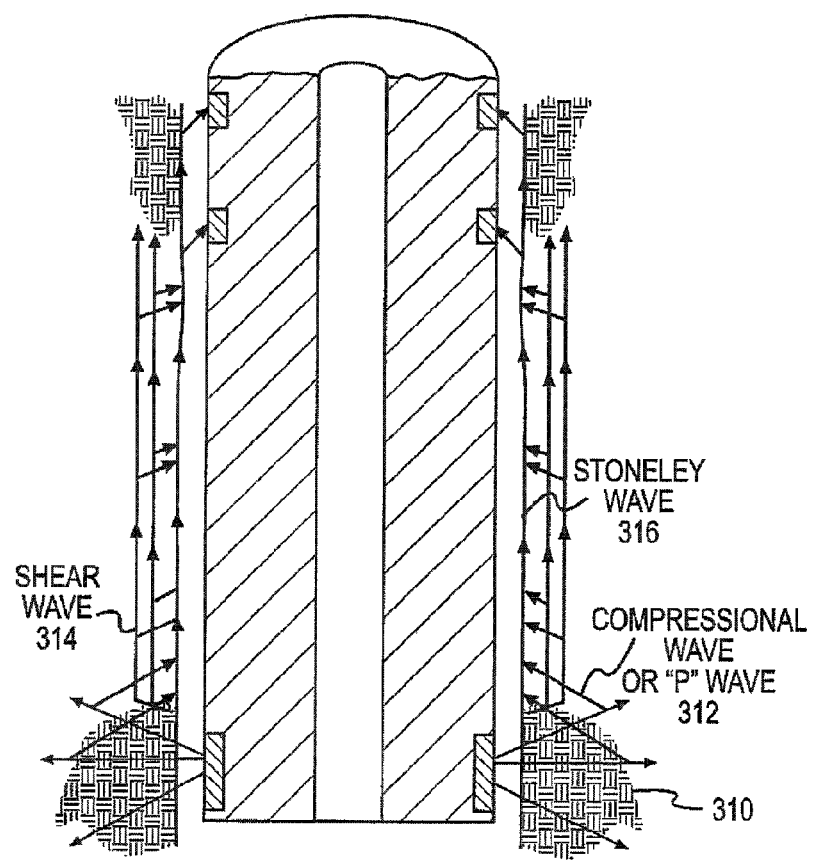
FIG. 3 is a schematic diagram disclosing traditional sonic wave technology including a representative transmitter, receivers and compressional waves, shear waves and Stoneley sonic waves adjacent a thick walled drill collar.

Turning now to the drawings, the subject invention is directed to the concept of estimating formation permeability from the measured sonic wave Stoneley attributes and particularly the Stoneley attributes of slowness (DTst) and attenuation (ATTst), taking into consideration the existence of a heavy walled drill collar at the end of the drill string and the relative lack of borehole mud cake during a drilling operation. In the subject LWD application a real-time qualitative indication for fracture and permeable zones is estimated from Stoneley measurements. This information is useful to a driller to make important timely decisions about drilling and completion programs.

Context of the Invention

FIG. 1 discloses a drilling derrick 100 positioned over a well hole 102 being drilled into an earth formation 104. The drilling derrick has the usual accompaniment of drilling equipment including a processor 106 and recorder 108 of the type used for measurements-while-drilling (MWD) or logging while drilling (LWD) operations. A more detailed disclosure of conventional drilling equipment of the type envisioned here is described in Schlumberger's Wu et al published application No. 2006/0120217 the disclosure of which is incorporated by reference as though set forth at length.

The borehole is formed by a drill string 110 carrying a drill bit 112 at its distal end. The drill bit crushes its way through earth formations as the drill string is rotated by drilling equipment within the drilling derrick. The depth of a well will vary, but may be as much at 25,000 feet or more in depth.

Turning to FIGS. 2a-2c, a quadrupole acoustic wave LWD tool segment 114 is shown in a degree of schematic detail. A more detailed discussion of a LWD tool of this type can be seen in Hsu et al. Publication No. US 2003/0058739 of common assignment with the subject application. The disclosure of this entire publication is incorporated by reference here. Briefly, however, the quadrupole LWD tool segment 114 includes at least one transmitter ring 200 and an array of receivers 212.

FIG. 2b illustrates a transmitter 200 divided into four quadrants 202, 204, 206 and 208. Each quadrant contains a quarter-circle array of piezoelectric transducer elements 210. FIG. 2B shows six piezoelectric transducer elements in each quadrant although in some embodiments nine elements may be preferred uniformly spaced around the azimuth.

As noted above, an array of quadrupole receivers 212 is shown in FIG. 2a embedded within the side wall of drill pipe segment 114. These receivers are spaced vertically and may be five to fifty or more in a vertical array. The receivers are similar to the transmitter in that each receiver 214 of receiver array 212 has a quarter circle of piezoelectric transducer elements in each of quadrants 216, 218, 220 and 222 as shown in FIG. 2c. Each ring transducer is capable of detecting a wave refracted through a formation or along the borehole wall as discussed more fully in the above referenced Hsu et al publication US 2003/0058739.

Like FIGS. 2a-2c, FIG. 3 discloses an LWD system where sonic transmitters and receivers are embedded within the side walls of a drill string near the drilling bit. FIG. 3 also illustrates the alternative paths that sonic waves emitted from the transmitter may travel from the transmitter to receiver. The compressional or P waves 312 penetrate the surrounding earth formation 310 deeply before being refracted back to the receivers. The shear or S waves 314 propagate upward through the formation but in close proximity to the borehole. The Stoneley (ST) or tube waves 316 propagate along the interface between the formation and the borehole fluid before being detected at the array of receivers. The attributes of the Stoneley waves are used in this invention to estimate formation permeability. An increase in the permeability of the formation is associated, as an example, with an increase in both Stoneley wave slowness (DTst) and attenuation (ATTst).

Figure 4A:
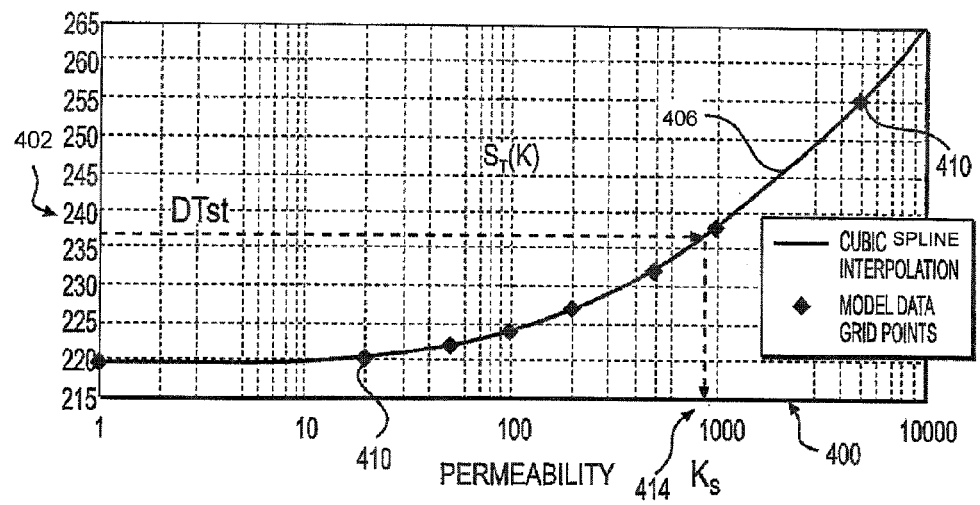
FIG. 4a is a graphic representation of a method for obtaining estimated permeability from measured Stoneley slowness (DTst)
Figure 4B:
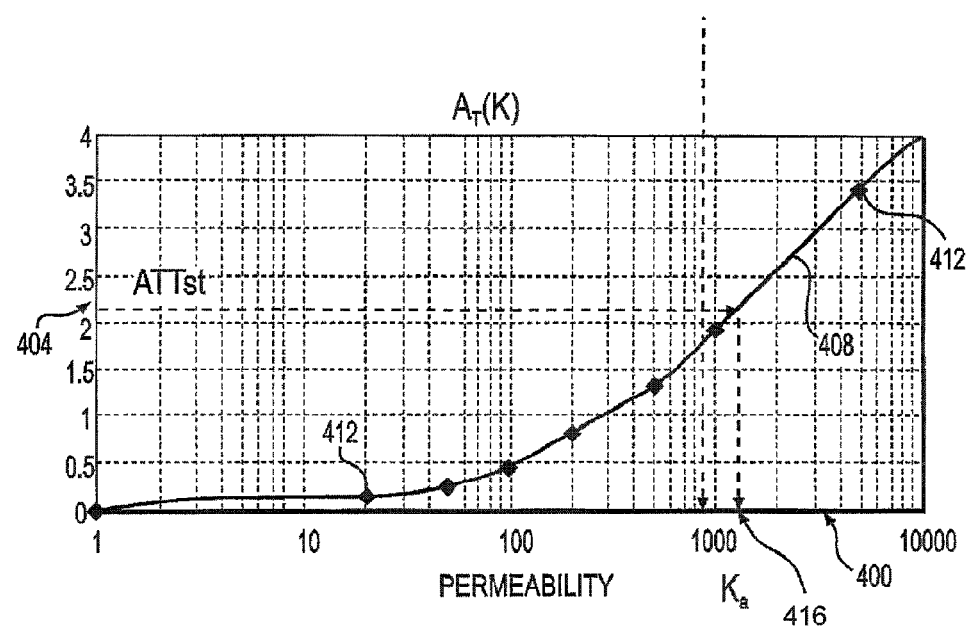
FIG. 4b is a graphic representation of a method for obtaining estimated permeability from measured Stoneley attenuation (ATTst)

FIGS. 4a and 4b illustrate graphically the relationships between the permeability of the formation (K) plotted on the x-axis 400 of both figures and Stoneley wave slowness (DTst) plotted along the y-axis of FIG. 4a 402 and Stoneley wave attenuation (ATTst) plotted along the y-axis of FIG. 4b 404. The curve 406 in FIG. 4a and the curve 408 in FIG. 4b represent the theoretical relationships between the permeability of the formation ($\kappa$) and Stoneley wave slowness (DTst) and Stoneley wave attenuation (ATTst), respectively. These relationships are derived from input parameters, formulas, model waveforms, and wave processing models as described in more detail below.

Table 1 lists the input parameters that are properties of the rock and the borehole, including the borehole fluid and the drill collar at the distal end of an operating drill string. The input parameters are needed to generate waveforms that model those from the LWD sonic tool. Some of these properties are directly measured by known logging techniques and others may be inferred from logs and other physical data for the particular oil field.

TABLE 1

Input Parameters

| | |
|---|---|
| Rb: | borehole radius |
| Vmud: | borehole fluid compressional velocity |
| $\rho\_mud$: | borehole fluid density |
| Rt: | collar radius |
| Vtp: | collar material compressional velocity |
| Vts: | collar material shear velocity |
| $\rho\_t$: | collar material density |
| $\Phi$: | formation porosity |
| Vp: | saturated formation compressional velocity |
| Vs: | saturated formation shear velocity |
| $\rho$: | average formation density |
| $\rho\_s$: | rock grain density |
| $K\_s$: | rock grain bulk modulus |
| $K\_f$: | pore fluid bulk modulus |
| $\rho\_f$: | pore fluid density |
| $\eta$: | pore fluid viscosity |
| $\kappa$: | formation permeability |

The collar radius, material density, compressional velocity and shear velocity are known values. The borehole radius, fluid density and compressional velocity can be obtained from logging data and well site samples. The formation density, porosity, compressional velocity, and shear velocity can be obtained routinely from logging data. The formation type is routinely obtained from interpretation of Gamma Ray, sonic, resistivity, and nuclear logs. The rock grain density and bulk modulus for most of the known formation types are measured and tabulated in standard handbooks such as "Handbook of Physical Properties of Rocks, R. S. Carmichael, CRC Press, 1982. The pore fluid density, bulk modulus, and viscosity can be estimated from the LWD fluid samples or from existing knowledge of the reservoir.

Thus, other than $\kappa$, the formation permeability, all of the input parameters in Table 1 will be estimated from logging data, site samples, or field information. The estimated parameter values are used in a theoretical formula, such as the one described by J. H. Rosenbaum in "Synthetic Microseismograms: Logging in Porous Formations", Geophysics, Vol. 39, No. 1, February 1974, to compute model waveforms generated by a source similar to the LWD sonic tool. The disclosure of this Rosenbaum publication is incorporated here by reference. A number of model waveform sets corresponding to different values for formation permeability, $\kappa$, over the expected range of $\kappa$ will be generated at each data frame.

The model waveforms for each value of permeability $\kappa$ will be processed, for example with the slowness-time-coherence (STC) algorithm, to extract estimates of Stoneley slowness and attenuation within a selected frequency band. The selection of the frequency band depends on the formation type and the drilling noise, which in turn depends on the type of the bit and the rate of penetration. The frequency band generally varies from 0.5 to 10 KHz and is selected to maximize the signal to noise ratio for the Stoneley signal. The frequency content of drilling noise is usually concentrated at low frequency (<1 KHz) and decreases rapidly at higher frequencies. The frequency content of Stoneley wave tends to be concentrated at higher frequencies for harder formations and at lower frequencies for softer formations.

As illustrated in FIGS. 4a and 4b, interpolated curves of model Stoneley slowness and attenuation as functions of permeability $\kappa$, $S_T(\kappa)$ 406 and $A_T(\kappa)$ 408, respectively, can be obtained by processing model waveforms at the discrete values of $\kappa$ that were selected. (These grid points or discrete permeability values used by the model are shown as diamond dots 410 and 412). The measured Stoneley slowness DTst, which was obtained during an LWD operation using the same frequency band and the same processing algorithm used to derive the interpolated theoretical curve 406, will be compared with the curve to determine the corresponding permeability value $K_s$. 414. The subscript s here denotes the permeability inferred from measured slowness. Similarly, the measured Stoneley attenuation, ATTst, will be compared with the interpolated $A_T(\kappa)$ curve 408 to determine the corresponding permeability value $K_a$ 416. Under ideal condition, $K_s$ will be equal to $K_a$. However, due to measurement noise and the inability of a model to perfectly represent reality, $K_s$ and $K_a$ will likely assume different values.

Figure 5:
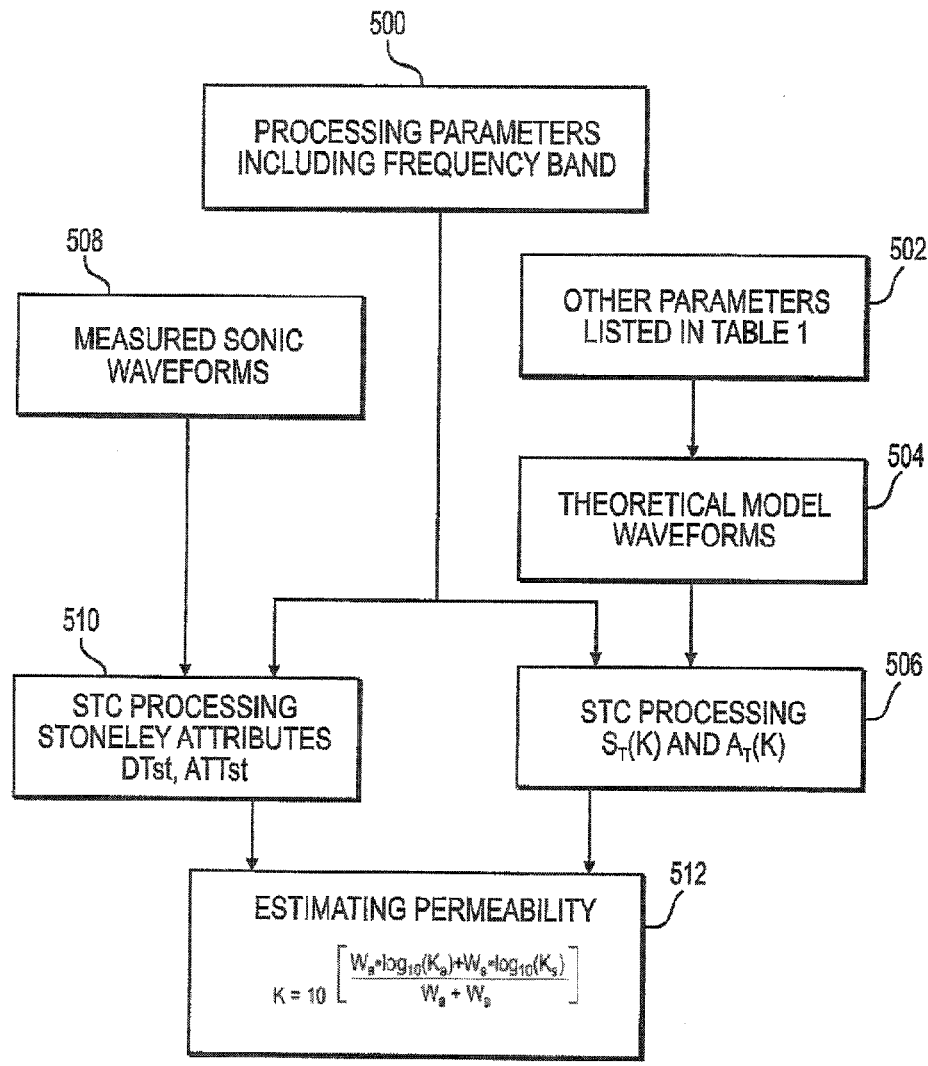
FIG. 5 is a flow chart for a processing algorithm to estimate formation permeability from measured LWD Stoneley sonic wave attributes.

FIG. 5 depicts a flow chart for the previously defined process for deriving two estimates, $K_s$ and $K_a$, of formation permeability. The steps in this flow chart, like the graphs in FIGS. 4a and 4b, will be repeated at each depth frame to estimate the permeability at each frame. The processing parameters, including the frequency band, 500, are input to the wave processing model, shown here as the STC processing model 506 and 510. The theoretical curves $S_T(\kappa)$ and $A_T(\kappa)$ are derived along the right side of the flow chart—boxes 502, 504, and 506.

The above processing steps do not involve attributes of the actual Stoneley waves transmitted and received by the LWD tool. The measured waves 508 are processed downhole 510 using the same processing parameters and method used in box 506 to process the theoretical model waveforms and are carried out by a downhole computer system. Only the estimated Stoneley attributes, such as, DTst and ATTst and any of the parameters in box 502, that are generated during LWD operations are transmitted uphole.

A weighted geometric mean, between $K_s$ and $K_a$, is used as the estimated permeability K, as shown in box 512. The $w_a$ and $w_s$, chosen by the user, are weighting coefficients for the attenuation and slowness contributions, $K_s$ and $K_a$, respectively. The weighting coefficients are nonnegative and sum to one. If both were one half the two estimates $K_s$ and $K_a$ would be equally weighted in determining the final estimate permeability K The spread between the $K_s$ and $K_a$ can be used also as a quality indicator for the result. Smaller spread indicates higher consistency between the model and data and hence higher quality of the result.

The model employed in this algorithm is for Stoneley wave in a borehole with a drill collar LWD tool through a permeable formation such as described by Biot (1956 J. Acoustic Society of America, V28, p 168-191). The disclosure of this Biot publication is incorporated here by reference. For fractured formations, the permeability thus obtained is the equivalent permeability over the volume of the rock sensed by the Stoneley wave.

In this disclosure, we mentioned STC processing as one suggested means of obtaining the Stoneley wave slowness and attenuation from both measured waveforms and model waveforms. Other means of comparing the measured and model Stoneley wave dispersion curves, such as Prony's method (Hauer, J. F. et al (1990). "Initial Results in Prony Analysis of Power System Response Signals". IEEE Transactions on Power Systems, 5, 1, 80-89.) may work as well.

As used in this patent terms and expressions which have multiple meanings it is intended that the expression used be inclusive and have the broadest meaning unless there is a specific limitation noted. As an example, the expression attributes of Stoneley waveforms is intended to be inclusive of all Stoneley attributes although the attributes of slowness and attenuation are of particular interest and application.

The various aspects of the invention were described in order to explain principles of the invention and its practical applications. The preceding description is intended to enable those of skill in the art to best utilize the invention in various embodiments and with modifications as are suited to the particular use contemplated. It is intended that the scope of the invention be defined by the following claims.

What is claimed is:

1. A method for estimating formation permeability using at least one attribute of Stoneley waveforms in a borehole under logging while drilling conditions of a drill string with a drill collar at a distal end, said method comprising:
   determining process parameters including a desired frequency band to increase signal-to-noise ratio, wherein the frequency band depends on formation type and drilling noise;
   determining model input parameters for a waveform model including properties of rock formation and the borehole, including a borehole fluid and the drill collar;
   modeling a Stoneley waveform based on the input parameters including the drill collar radius, the drill collar material density, the drill collar material shear velocity and the drill collar material compressional velocity, and a range of discrete values for permeability;
   processing the modeled waveforms corresponding to the selected input values of permeability to obtain Stoneley wave slowness or Stoneley wave attenuation;
   generating a model curve of the Stoneley wave slowness or Stoneley wave attenuation as a function of permeability by using the values of permeability;
   transmitting a sonic wave and receiving a sonic Stoneley wave with a LWD tool including the drill collar;
   processing the received waveform for Stoneley wave slowness or Stoneley wave attenuation using the same processing method and processing parameters used to process the modeled waveforms; and
   using the model curve that relates permeability to the Stoneley wave slowness or Stoneley wave attenuation, estimating formation permeability from the attribute of the Stoneley wave measured during LWD operations.

2. The method for estimating formation permeability using slowness and attenuation attributes of Stoneley waveforms in a borehole under logging while drilling conditions as defined in claim 1, and further comprising:
   computing a single estimate of permeability from the estimates, $K_s$ and $K_a$ obtained from the slowness and attenuation attributes of Stoneley waveforms in accordance with the following formula for the weighted geometric mean of $K_s$ and $K_a$:

$$K = 10^{\left[\frac{W_a * \log_{10}(K_a) + W_s * \log_{10}(K_s)}{W_a + W_s}\right]}$$

where: $W_a$, $W_s \geq 0$; $W_a + W_s = 1$.

3. The method for estimating formation permeability using slowness and attenuation attributes of Stoneley waveforms in a borehole under logging while drilling conditions as defined in claim 1, wherein said determining model input parameters for a waveform model including properties of rock formation and the borehole, including a borehole fluid and the drill collar-include:
   determining borehole fluid compressional velocity; and
   determining borehole fluid density.

4. The method for estimating formation permeability using slowness and attenuation attributes of Stoneley waveforms in a borehole under logging while drilling conditions as defined in claim 1, wherein said determining model input parameters comprises:
   determining values for:
      borehole radius,
      borehole fluid compressional velocity,
      borehole fluid density,
      collar radius,
      collar material compressional velocity,
      collar material shear velocity,
      collar material density,
      formation porosity,
      saturated formation compressional velocity,
      saturated formation shear velocity,
      average formation density,
      rock grain density,
      rock grain bulk modulus,
      pore fluid bulk modulus,
      pore fluid density, and
      pore fluid viscosity.

5. The method for estimating formation permeability using at least one attribute of Stoneley waveforms in a borehole under logging while drilling conditions as defined in claim 1, wherein said processing the received waveform for at least one Stoneley attribute using the same processing method and processing parameters used to process the modeled waveforms comprises:
   processing with a slowness-time-coherence algorithm using a frequency from within a band of from 0.5 KHz to 10 KHz.

6. The method for estimating formation permeability using at least one attribute of Stoneley waveforms in a borehole under logging while drilling conditions as defined in claim 1, wherein mud cake is absent along the borehole side walls.

7. The method for estimating formation permeability using at least one attribute of Stoneley waveforms in a borehole under logging while drilling conditions as defined in claim 1, wherein said generating a model curve of at least one Stoneley attribute as a function of permeability by using the values of permeability comprises interpolating between the values of permeability.

8. A method for estimating formation permeability using slowness and attenuation attributes of Stoneley waveforms in a borehole under logging while drilling conditions with a drill string having a drill collar at a distal end, said method comprising:
  determining process parameters including a desired frequency band to increase signal-to-noise ratio, wherein the frequency band depends on formation type and drilling noise;
  determining model input parameters for a waveform model including properties of rock formation and the borehole, including a borehole fluid and the drill collar;
  modeling a Stoneley waveform based on the input parameters including the drill collar radius, the drill collar material density, the drill collar material shear velocity and the drill collar material compressional velocity, and a range of discrete values for permeability;
  processing the modeled waveforms corresponding to the selected input values of permeability to obtain slowness and attenuation attributes of Stoneley waveforms;
  generating a model curve of slowness and attenuation attributes of Stoneley waveforms as a function of permeability by using the values of permeability;
  processing the measured waveform for slowness and attenuation attributes of Stoneley waveforms using the same processing method used to process the modeled waveforms;
  applying the slowness and attenuation attributes of Stoneley waveforms to corresponding modeled curves of the Stoneley attributes as a function of permeability; and
  using the curves that relate permeability to the Stoneley attributes, estimating permeability from the attributes of the Stoneley wave measured during LWD operations.

9. The method for estimating formation permeability using slowness and attenuation attributes of Stoneley waveforms in a borehole under logging while drilling conditions with a drill string having a drill collar at a distal end, as defined in claim 8, wherein said determining model input parameters comprises:
  determining values for;
    borehole radius,
    borehole fluid compressional velocity,
    borehole fluid density,
    collar radius,
    collar material compressional velocity,
    collar material shear velocity,
    collar material density,
    formation porosity,
    saturated formation compressional velocity,
    saturated formation shear velocity,
    average formation density,
    rock grain density,
    rock grain bulk modulus,
    pore fluid bulk modulus,
    pore fluid density, and
    pore fluid viscosity.

10. The method for estimating formation permeability using slowness and attenuation attributes of Stoneley waveforms in a borehole under logging while drilling conditions with a drill string having a drill collar at a distal end, as defined in claim 9, and further comprising:
  computing a single estimate of permeability from the estimates, $K_s$ and $K_a$ obtained from the slowness and attenuation attributes of Stoneley waveforms in accordance with the following formula for the weighted geometric mean of $K_s$ and $K_a$;

$$K = 10^{\left[\frac{W_a * \log_{10}(K_a) + W_s * \log_{10}(K_s)}{W_a + W_s}\right]}$$

where: $W_a$, $W_s \geq 0$; $W_a + W_s = 1$.

11. The method for estimating formation permeability using slowness and attenuation attributes of Stoneley waveforms in a borehole under logging while drilling conditions with a drill string having a drill collar at a distal end, as defined in claim 8, wherein said processing the modeled waveforms corresponding to the selected input values of permeability to obtain slowness and attenuation attributes of Stoneley waveforms, and processing the measured waveform for slowness and attenuation attributes of Stoneley waveforms using the same processing method used to process the modeled waveforms comprises:
  processing with a slowness-time-coherence algorithm using a frequency from within a band of from 0.5 KHz to 10 KHz.

12. The method for estimating formation permeability using slowness and attenuation attributes of Stoneley waveforms in a borehole under logging while drilling conditions with a drill string having a drill collar at a distal end as defined in claim 8, wherein mud cake is absent along the borehole side walls.

13. The method for estimating formation permeability using slowness and attenuation attributes of Stoneley waveforms in a borehole under logging while drilling conditions with a drill string having a drill collar at a distal end as defined in claim 8, wherein said generating a model curve of slowness and attenuation attributes of Stoneley waveforms as a function of permeability by using the values of permeability comprises interpolating between the values of permeability.

* * * * *